US008586929B2

(12) United States Patent
Barth

(10) Patent No.: US 8,586,929 B2
(45) Date of Patent: Nov. 19, 2013

(54) METHOD AND APPARATUS FOR DETERMINING THE DISTANCE TO AN OBJECT EMITTING AN IR SIGNATURE

(75) Inventor: Jochen Barth, Oberschleissheim (DE)

(73) Assignee: EADS Deutschland GmbH, Ottobrunn (DE)

( * ) Notice: Subject to any disclaimer, the term of this patent is extended or adjusted under 35 U.S.C. 154(b) by 476 days.

(21) Appl. No.: 12/919,669

(22) PCT Filed: Feb. 10, 2009

(86) PCT No.: PCT/DE2009/000186
§ 371 (c)(1),
(2), (4) Date: Nov. 22, 2010

(87) PCT Pub. No.: WO2009/106037
PCT Pub. Date: Sep. 3, 2009

(65) Prior Publication Data
US 2011/0058152 A1  Mar. 10, 2011

(30) Foreign Application Priority Data

Feb. 26, 2008 (DE) .................... 10 2008 011 123

(51) Int. Cl.
*G01S 11/12* (2006.01)
(52) U.S. Cl.
USPC .................... 250/342; 250/339.14
(58) Field of Classification Search
USPC ............................ 250/342, 339.14
See application file for complete search history.

(56) References Cited

U.S. PATENT DOCUMENTS

| 3,026,413 | A |   | 3/1962  | Taylor |
|-----------|---|---|---------|--------|
| 4,658,368 | A |   | 4/1987  | Blais |
| 4,883,963 | A | * | 11/1989 | Kemeny et al. .......... 250/339.11 |
| 5,282,013 | A | * | 1/1994  | Gregoris ................. 356/4.07 |
| 5,469,265 | A |   | 11/1995 | Measures et al. |
| 5,677,761 | A |   | 10/1997 | Hasson |
| 5,894,343 | A |   | 4/1999  | French |
| 6,222,618 | B1|   | 4/2001  | Hasson |

FOREIGN PATENT DOCUMENTS

| DE | 196 46 873 C1 | 5/1997 |
| DE | 38 43 302 A1  | 3/1999 |
| DE | 34 14 798 A1  | 4/1999 |
| GB | 2 305 503 A   | 4/1997 |
| GB | 2 323 730 A   | 9/1998 |

OTHER PUBLICATIONS

Powell et al. An infrared flame detector with fire-ranging ability, Proceedings of SPIE vol. 807 (Sep. 1987), pp. 69-72.*
Bakker et al. From hyperspectral imaging to dedicated sensors, Proceedings of SPIE vol. 4029 (Jul. 2000), pp. 312-323.*
International Search Report dated Jul. 1, 2009 (six (6) pages).

* cited by examiner

*Primary Examiner* — David Porta
*Assistant Examiner* — Shun Lee
(74) *Attorney, Agent, or Firm* — Crowell & Moring LLP

(57) ABSTRACT

In a method for determining the distance of an object flying through the atmosphere and emitting radiation energy, the spectral intensity distribution of the radiation emitted by the object in a predefined wavelength range is detected. An intensity distribution spectrum of the object is measured in the region of an absorption structure of the atmosphere, and a point having an extremal gradient on a flank of an intensity rise or fall, caused by the atmospheric absorption structure, in the measured intensity distribution spectrum is determined. The path length traveled by the radiation through the atmosphere, and therefore also the distance between the detector and the object, are determined by comparison with known transmission data for the atmosphere.

10 Claims, 3 Drawing Sheets

METHOD AND APPARATUS FOR DETERMINING THE DISTANCE TO AN OBJECT EMITTING AN IR SIGNATURE

This application is a national stage of PCT International Application No. PCT/DE2009/000186, filed Feb. 10, 2009, which claims priority under 35 U.S.C. §119 to German Patent Application No. 10 2008 011 123.6, filed Feb. 26, 2008, the entire disclosure of which is herein expressly incorporated by reference.

BACKGROUND AND SUMMARY OF THE INVENTION

The invention relates to a method and apparatus for determining the distance to an object that emits an IR signature.

The invention is important, in particular, when an aircraft is threatened by a self-propelled missile. Most short-range and medium-range missiles generally have an infrared homing head which is sensitive to radiation emitted by the aircraft (primarily from the engines), and operates according to a target-seeking guidance method. Such guided missiles are relatively simple to produce and can be launched from shoulder-carried weapons (so-called rocket launchers).

Since such missiles—in contrast to radar-guided missiles—passively head for their target, optical warning sensors are increasingly important in order to be able to initiate countermeasures against such approaching missiles at an appropriate and sufficient time.

German patent document DE 195 46 873 C1 discloses a method and apparatus having a passive imaging sensor which detects the approaching object in at least two wavelength ranges for which the atmospheric attenuation coefficients are different, by connecting a rotating filter upstream of the optical system of the passive warning sensor. (The filter consists of a plurality of sectors whose transmission ranges are different according to the selected wavelength ranges.) The sensor signals corresponding to the radiation power of the approaching object at the different wavelengths that are detected by the sensor, are then used to determine the distance and/or speed of the object (for example, of a missile approaching an aircraft), taking into account the difference in the atmospheric attenuation coefficients.

The method described in German patent document DE 195 46 873 C1 is based on spectrally resolved measurements at discrete wavelengths and determines the object distance by forming the ratio of two respective sensor signals in different wavelength ranges. However, this method is very inaccurate.

German patent document DE 34 14 798 A1 discloses a passive rangefinder for detecting radiation from emitting objects, in which sun glint radiation in the wavelength range below 2.9 µm is measured. Radiation is also measured in a so-called blue spike and a red wing, which are situated respectively on the short-wave and long-wave sides of an atmospheric absorption band. From these measurements, a theoretical spectrum is generated for each wavelength in the range of wavelengths of interest, which spectrum is weighted with a transmission factor that constitutes the proportion of radiation allowed to pass over the distance R taking into account absorption by atmospheric carbon dioxide and nitrogen oxide. The distance to the object is determined by comparing the theoretical and experimental results.

One object of the present invention is to provide a method and apparatus which can be used to provide data relating to an approaching object in a faster and more accurate manner than in the prior art.

This and other objects and advantages are achieved by the method according to the invention, in which the spectral intensity distribution (also referred to as the intensity distribution spectrum) of a detected object is measured in the region of an absorption structure of the atmosphere. In the measured intensity distribution spectrum, a point is determined having an extremal gradient on a flank of an intensity rise or fall, caused by the atmospheric absorption structure. The path length which is traveled by the radiation through the atmosphere (and corresponds to the distance between the detector and the object) is determined by comparison with known transmission data for the atmosphere. The temporal shift in the position is also expediently determined from corresponding distance measurements at two different points in time, and is used to calculate the relative speed between the detector and the object. In this case, the intensity distribution spectrum can be recorded with regard to the wavelength or the frequency.

In other words, the method according to the invention makes it possible to determine the spectral position of the flank of the spectral intensity distribution at different points in time using the point having a maximum gradient. This is considerably more accurate than the determination, as described in German patent document DE 195 46 873 C1, by forming the ratio of discrete measurements at different wavelengths and is largely independent of the spectral distribution of the intensity emitted by the object, since only a narrow wavelength range has to be evaluated.

The spectral intensity distribution is expediently investigated in a wavelength range which is in the region of atmospheric absorption lines, preferably in the vicinity of those absorption lines that are caused by gases whose concentration fluctuates only slightly with the climatic conditions. The wavelength range of, for example, 4-5 µm (expediently, 4.3-4.7 µm) which is in the mid-infrared on the short-wave and long-wave sides of the $CO_2$ absorption line is particularly suitable for this purpose. It goes without saying that the spectral intensity distribution can also be investigated in a corresponding frequency range.

The apparatus according to the invention comprises input optics with an electrically tunable wavelength filter having a voltage-dependent filter characteristic curve, a passively imaging detector for detecting the radiation from the object, a first circuit for processing the detector signal, and a second circuit for generating a periodically varying control voltage for the wavelength filter. The first circuit is expediently constructed from a differentiating element, an analog/digital converter and a signal analysis processor, and the second circuit is essentially constructed from a function generator, a clock generator and a summation element. The apparatus also comprises a voltage source for generating an offset voltage for the voltage to be supplied to the wavelength filter.

The method according to the invention makes it possible to completely detect and evaluate the entire IR radiation emitted by an object at any point in time. The entire two-dimensional image field of an object to be investigated is thus detected. The apparatus according to the invention is thus used to supply all radiation focused by the lens into the image plane to spectral evaluation. In contrast to the prior art, as described in UK patent document GB 2 323 730 A for example, the entire object rather than object sections is considered in principle.

Other objects, advantages and novel features of the present invention will become apparent from the following detailed

DETAILED DESCRIPTION OF THE DRAWINGS

Figure 1:
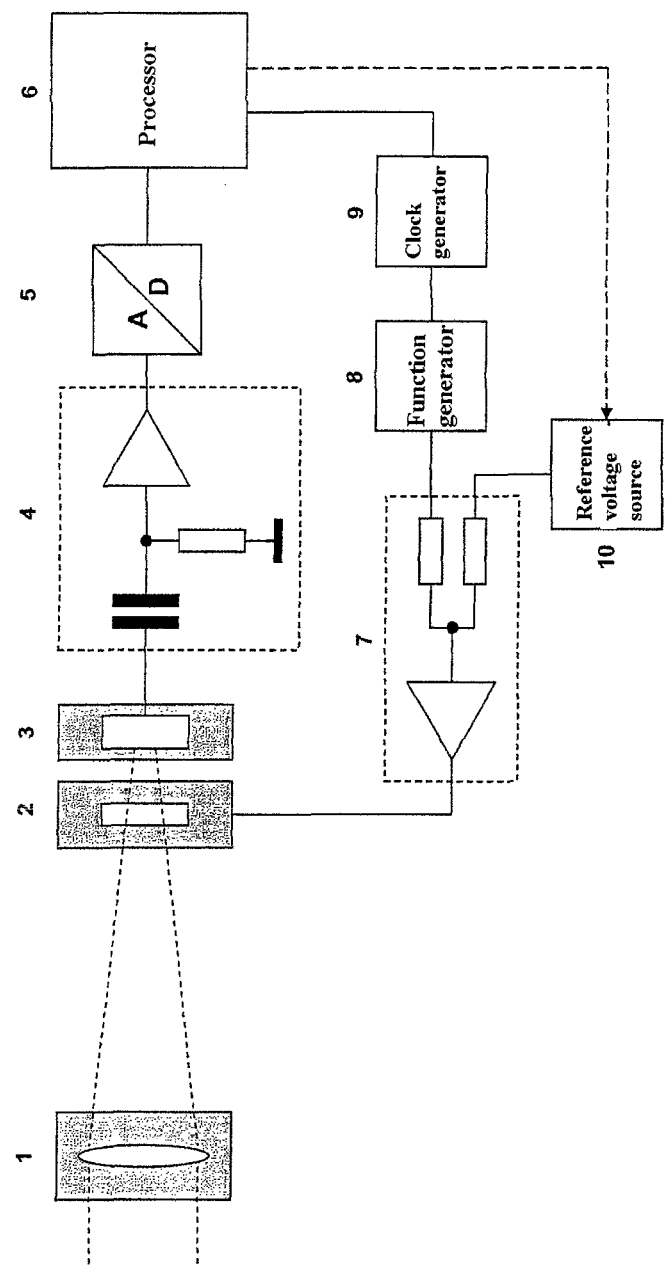
FIG. 1 is a schematic depiction of an apparatus according to the invention.

FIG. 1 is a schematic illustration of the structure of an apparatus according to the invention, which includes essentially a sensor having input optics 1, in the form of a lens, and an electrically tunable wavelength filter 2 which is arranged upstream of a detector 3. The wavelength filter 2 may be, for example, a silicon-based Fabry-Perot filter.

The detector signals are supplied to a signal analysis processor 6 via a differentiating element 4 and an analog/digital converter 5. The signal analysis processor 6 controls a clock generator 9 for generating a temporal reference signal. On the other hand, the signal analysis processor 6 also controls a voltage source 10. The clock generator 9 supplies a temporal reference signal to a function generator 8 for generating a periodically varying voltage. This periodic voltage and the voltage from the voltage source are added in a summation element 7 and are supplied to the wavelength filter 2 as a control voltage. The latter thus has a constant voltage component, resulting from the voltage source 10, and a periodic voltage component, resulting from the function generator 8.

According to the invention, the electrically tunable wavelength filter 2 is driven in such a manner that a wavelength range $\Delta\lambda$ around a fixed, center wavelength $\lambda_0$ is periodically scanned according to the relationship $$\lambda(t)=\lambda_0+\Delta\lambda \cdot P(t) \quad (1)$$

where P(t) denotes a temporally periodic function.

In order to control the electrically tunable wavelength filter, a periodically varying voltage (for example sinusoidal, triangular-waveform or saw-tooth) is correspondingly generated at an offset. For a control voltage of $$U(t)=U_0+\Delta U \cdot \cos(\omega t),$$

the following is obtained with the aid of the characteristic curve f(U) of the wavelength filter $$\lambda(t)=f(U_0)+f(\Delta U \cdot \cos(\omega t)) \quad (2).$$

In this case, the offset voltage $U_0$ stipulates the center wavelength $\lambda_0$, and the amplitude $\Delta U$ determines the scanning wavelength range $\Delta\lambda$. The parameters $U_0$ and $\Delta U$ are selected in such a manner that the spectral features of the object signature which are to be detected are in the scanning range.

The detector signal generated in this manner is differentiated and converted into digital signals which are processed by a signal analysis processor that extracts the spectral features. As a result of differentiation, the proportion of spectrally unstructured background radiation in the signal is omitted, and the spectral features of the object radiation are highlighted more clearly.

The processor assigns the extracted spectral features to the wavelength by temporally referencing the digitized detector signal to the clock signals from the clock generator, and thus to the control voltage instantaneously applied to the wavelength filter.

Figure 2:
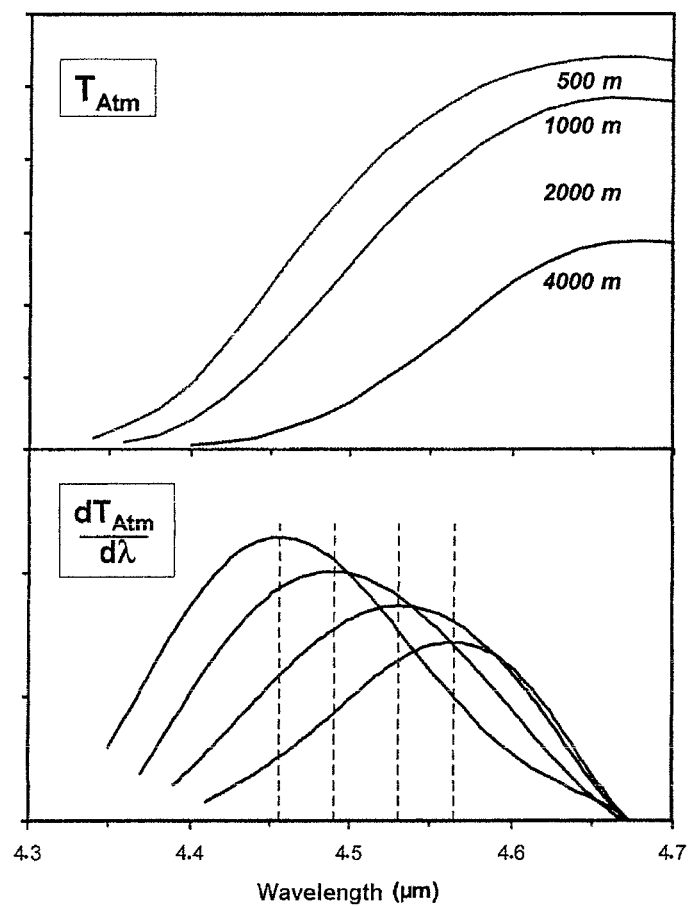
FIG. 2 is a graphic illustration of atmospheric $CO_2$ absorption as a function of the distance between the detector and the object and the wavelength.

If the distance determination with the aid of the spectral flank produced by the atmospheric $CO_2$ absorption at wavelengths of between 4 μm and 5 μm is specifically considered, the parameters for scanning the wavelength range can be advantageously selected as $\lambda_0$=4.5 μm and $\Delta\lambda$=0.15 μm according to the bottom of FIG. 2. The upper part of FIG. 2 shows the atmospheric transmission T as a function of the wavelength for the distances of 500 m, 1000 m, 2000 m and 4000 m between the object and the detector. The lower part illustrates the respective derivatives.

Figure 3:
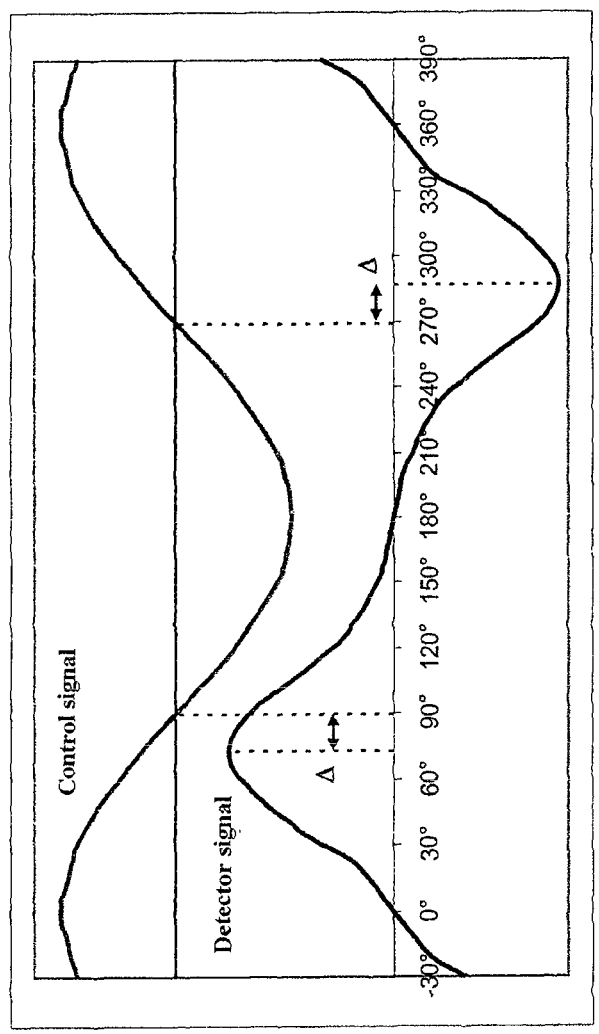
FIG. 3 shows the profile of the detector signal and of the control signal as a function of time.

These parameters give a periodically varying detector signal which is shown in FIG. 3, together with the control voltage for the wavelength filter according to equation (2). Relative units are plotted against the argument of the cos function of the control voltage, expressed as an angle in degrees. A check is first of all carried out in order to determine whether the magnitudes of the maximum and minimum in the differentiated detector signal exceed a predetermined threshold value. If so, there is a significant intensity flank in the detected range of the detector signal. The time of the zero crossing in the periodic component of the control voltage is then selected as a reference $t_0$, and the offset $\Delta$, as the difference from the position of the maximum in the differentiated detector signal, is obtained as the measurement variable which is determined by the processor.

Methods for extracting a peak position from an electrical signal are known, for example, from U.S. Pat. No. 4,658,368. The offset $\Delta$, and thus also the temporal shift $\Delta t$ between the peak position and the zero crossing in the periodic component of the control voltage, can thus be determined, from which the associated wavelength $\lambda$ ($t_0+\Delta t$) is then also obtained using the associated value of the control voltage U($t_0+\Delta t$) and the characteristic curve of the wavelength filter. The sought position of the spectral flank is thus determined.

In a first embodiment of the invention, a closed control loop can be produced by using the offset $\Delta$ as a controlled variable for tracking the magnitude of the reference voltage in such a manner that the offset $\Delta$ is adjusted to zero. The positions of the extremes in the differentiated detector signal thus coincide with the zero crossings of the reference signal. The control loop is illustrated in FIG. 1 by a dashed connection between the processor and the reference voltage source. In this case, the desired position of the spectral flank is obtained from the conversion of the magnitude of the regulated reference voltage using the characteristic curve of the wavelength filter.

In a second embodiment of the invention for determining the controlled variable $\Delta$ for tracking the reference voltage, the approximately fulfilled symmetry of the differentiated detector signal in the vicinity of the maximum is used. A time interval of a suitable magnitude is accordingly selected symmetrically around the time $t_0$ of the zero crossing in the periodic component of the control voltage. Within this interval, each digitized value of the differentiated detector signal is multiplied by the associated value of the periodic component of the reference signal and all products obtained in this manner are added. Since the periodic component of the reference signal is an odd function with respect to $t_0$, the result becomes zero if the controlled variable $\Delta$ disappears. The sum of the products is thus suitable as the controlled variable.

The invention makes it possible to reference to characteristic features of the spectral intensity distribution in a more accurate manner. For instance, the spectral position of a flank caused by atmospheric absorption can be determined exactly and can be tracked over time by driving the wavelength filter with a periodically varying voltage at an offset and evaluating the detector signal with the aid of (analog or digital) differentiation and peak detection. Peak detection can then be used to derive a control signal for tracking the offset voltage of the wavelength filter, such that this voltage always tunes the filter to the position of the flank of the spectral intensity distribution.

This results in the advantage that the spectral position of the flank is determined using the point having a maximum gradient. This technique is considerably more accurate than the determination by forming the ratio of discrete measurements at different wavelengths and is largely independent of the spectral distribution of the intensity emitted by the object. Tracking the offset voltage means that the spectral flank is always spectrally resolved in an optimal manner, regardless of its respective spectral position. Further advantages result from the type of processing of the detector signal, which improves the signal-to-noise ratio and is suitable, in particular, for detecting weak structures on a high base (differentiation).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining the distance of an object emitting an IR signature by using a detector to detect a spectral intensity distribution of radiation emitted by the object in a predefined wavelength range, said method comprising:
    measuring the intensity distribution spectrum of the object in the region of an absorption structure of the atmosphere;
    determining in the measured intensity distribution spectrum a point having a maximum gradient on a flank of an intensity rise or fall caused by the atmospheric absorption structure; and
    determining a path length traveled by the radiation through the atmosphere, and therefore also the distance between the detector and the object, by comparison with known transmission data for the atmosphere, wherein
    the intensity distribution spectrum is detected using said detector and an electrically tunable wavelength filter;
    a control voltage is supplied to the wavelength filter for controlling filter properties of the filter;
    a detector signal of the detector is differentiated, then digitized, and referenced to an instantaneous value of the control voltage applied to the wavelength filter;
    maximum and minimum values in the differentiated detector signal are compared with predefinable threshold values;
    if the magnitudes of the maximum and minimum values exceed a threshold value, an offset $\Delta$ in the form of a temporal shift $\Delta t$ is determined as the difference between occurrence of the maximum value in the differentiated detector signal and time $t_0$ of a zero crossing in a periodic component of the control voltage; and
    an associated wavelength $\lambda(t_0+\Delta t)$ is determined from said difference, using an associated value of the control voltage $U(t_0+\Delta t)$ and a characteristic curve of the wavelength filter.

2. The method as claimed in claim 1, wherein:
    the distance between the detector and the object is determined at two different points in time; and
    relative speed between the detector and the object is calculated from a temporal shift in the position.

3. The method as claimed in claim 1, wherein the control voltage has a periodically varying voltage component $\Delta U$ and a predefinable fixed offset voltage component $U_0$.

4. The method as claimed in claim 1, wherein
    a variable proportional to the offset $\Delta$ is used as a controlled variable for tracking the magnitude of the control voltage, with the offset $\Delta$ being regulated to zero.

5. The method as claimed in claim 1, wherein:
    a time interval is selected symmetrically around the time $t_0$; and
    the sum of the products of each digitized value of the differentiated detector signal with the associated value of the periodic component of the control signal is calculated within the interval of time.

6. The method as claimed in claim 1, wherein the predefined wavelength range is in the vicinity of atmospheric absorption lines that are caused by gases whose concentration fluctuates only slightly with climatic conditions.

7. The method as claimed in claim 6, wherein the predefined wavelength range is in the mid-infrared on the short-wave and long-wave sides of the $CO_2$ absorption line, at approximately 4.25 μm.

8. An apparatus comprising:
    input optics with an electrically tunable wavelength filter having a voltage-dependent filter characteristic curve, and a passively imaging detector for detecting an entire two-dimensional image field of an object to be investigated;
    a first circuit for processing a detector signal generated by the passively imaging detector, and
    a second circuit for generating a periodically varying control voltage for the wavelength filter;
    wherein, the first circuit comprises a differentiating element, an analog/digital converter and a signal analysis processor,
    wherein the detector and electrically tunable wavelength filter are configured to measure an intensity distribution spectrum of the object in a region of an absorption structure of the atmosphere;
    wherein a control voltage is supplied to the wavelength filter for controlling filter properties of the filter;
    wherein a detector signal of the detector is differentiated by the differentiating element, then digitized by the analog/digital converter, and referenced to an instantaneous value of the control voltage applied to the wavelength filter by the signal analysis processor;
    wherein the signal analysis processor is configured to
        compare maximum and minimum values in the differentiated detector signal with predefinable threshold values;
        determine an offset $\Delta$ in the form of a temporal shift $\Delta t$ if the magnitudes of the maximum and minimum values exceed a threshold value, wherein the offset $\Delta$ is determined as the difference between occurrence of the maximum value in the differentiated detector signal and time $t_0$ of a zero crossing in a periodic component of the control voltage;
        determine an associated wavelength $\lambda(t_0+\Delta t)$ from said difference using an associated value of the control voltage $U(t_0+\Delta t)$ and a characteristic curve of the wavelength filter;

determine in the measured intensity distribution spectrum a point having a maximum gradient on a flank of an intensity rise or fall caused by the atmospheric absorption structure; and determine a path length traveled by the radiation through the atmosphere, and therefore also the distance between the detector and the object, by comparison with known transmission data for the atmosphere.

9. The apparatus as claimed in claim 8, wherein the second circuit comprises a clock generator, a function generator for generating a periodically varying voltage in response to input of clock signals from the clock generator and a summation element for summing the periodically varying voltage generated by the function generator with the voltage from a constant voltage source to produce the control voltage.

10. The apparatus as claimed in claim 9, wherein the first circuit and the second circuit form a closed control loop together with the constant voltage source.

\* \* \* \* \*